United States Patent [19]
Whitmill

[11] 3,752,330
[45] Aug. 14, 1973

[54] PAN TURNING DEVICE
[75] Inventor: Robert L. Whitmill, Collegedale, Tenn.
[73] Assignee: McKee Baking Company, Collegedale, Tenn.
[22] Filed: Oct. 18, 1971
[21] Appl. No.: 190,070

[52] U.S. Cl. ............................ 214/1 Q, 198/211
[51] Int. Cl. ........................................ B65g 29/00
[58] Field of Search ............... 214/1 Q, 312, 314; 198/33 AD, 211

[56] References Cited
UNITED STATES PATENTS
| | | | |
|---|---|---|---|
| 3,403,768 | 10/1968 | Tobey et al. | 214/1 Q X |
| 2,772,766 | 12/1956 | Kellam | 214/1 Q X |
| 2,881,899 | 4/1959 | Rasmussen | 214/1 X |

FOREIGN PATENTS OR APPLICATIONS
| | | | |
|---|---|---|---|
| 621,533 | 4/1949 | Great Britain | 198/33 AD |
| 445,035 | 6/1927 | Germany | 214/1 Q |

*Primary Examiner*—Gerald M. Forlenza
*Assistant Examiner*—Frank E. Werner
*Attorney*—D. C. Roylance et al.

[57] ABSTRACT

A high speed turner is disclosed for inverting pans by rotating them 180°. A feeding means is provided for inserting the pans into the pan turner rotor, which is then rotated 180°. Subsequent feeding of another pan into the rotor forces the already inverted pan out of the rotor.

5 Claims, 4 Drawing Figures

Patented Aug. 14, 1973

INVENTOR,
ROBERT L. WHITMILL
BY Roylance, Abrams
Berdo
ATTORNEYS

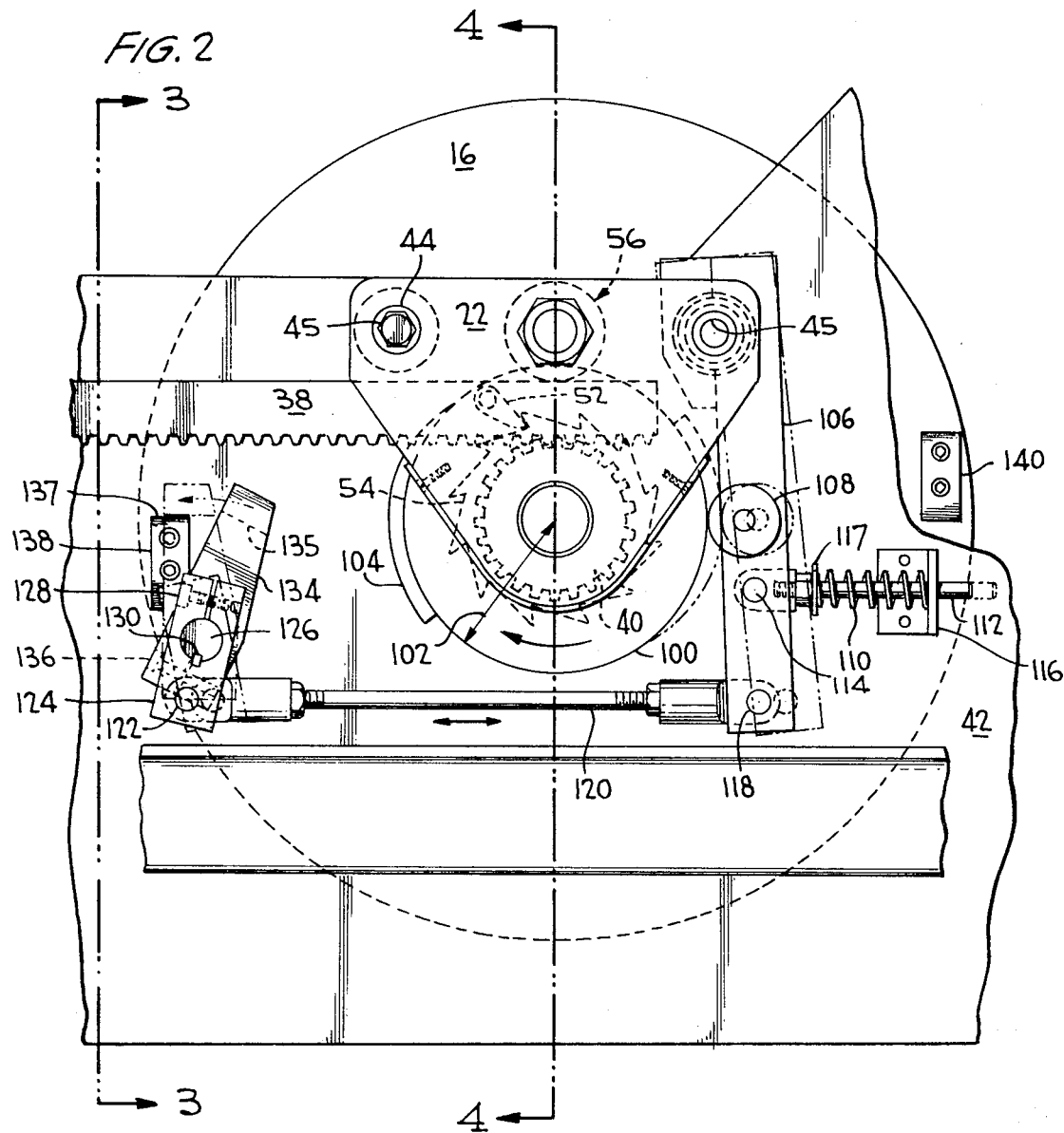

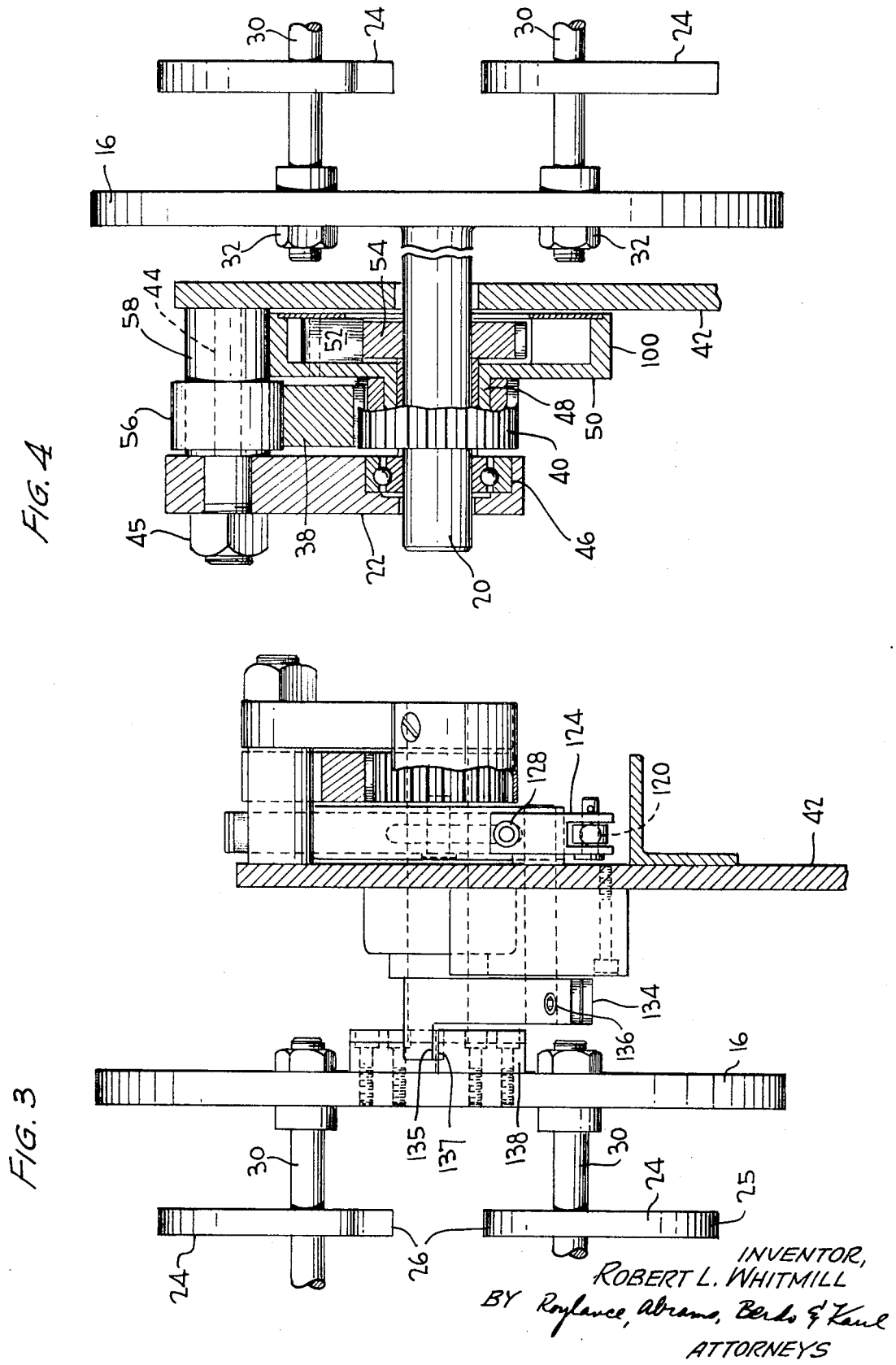

PAN TURNING DEVICE

The present invention relates generally to the field of article handling devices for the bakery trade, and more particularly to pan turning devices which are designed to invert an upside down pan.

In recent years, bakeries have become increasingly automated in order to reduce the cost of producing baked goods. One machine which has greatly facilitated the speed of baking cakes, for example, has been an automatic pan greasing machine. Inverted pans are fed into the pan greaser and grease is sprayed onto the inner pan surfaces which will contact the cake dough during the baking process. The pan is sprayed while it is in an inverted position in order that the excess grease sprayed upon the pan surfaces can drip off the pan into a grease reservoir of the machine and so that there is no excess grease to interfere with the nature or quality of the baking operation.

The pan, when it leaves the pan greaser, is in an upside down position and is not capable of receiving dough from an automatic dough depositor unless it is turned over. In some instances, a bakery might employ an individual to turn the pans from their upside down to their right side up position. This individual might also insert the upright pans into the dough depositing machine. Such an approach, however, is undesirable because of the cost.

In order to solve this problem, some attempts have been made to create automatic pan turning devices. These devices typically will incrementally turn the pan right side up by placing the pan into a rotor which is rotated by 90° each time the rotary mechanism is activated. This particular approach, however, has proved to be somewhat unreliable due to jamming of the mechanism. Also, it lends itself to a somewhat more uneven distribution of grease upon the baking surfaces because the pan is held in an edgewise, vertical position for a certain amount of time permitting the grease to collect on one side of the baking surfaces.

As a result of the foregoing problems:

It is a primary object of the present invention to provide a pan turning apparatus which will be efficient and will eliminate the need for human intervention into the pan turning process.

It is a further object of the present invention to provide a pan turning device in which the grease upon the baking surfaces remains substantially equally distributed after the pan has been turned to an upright position.

It is yet another object of the present invention to provide a pan turning device which is synchronized to a pan greasing machine and which permits the pan greaser to supply the force for pushing inverted pans into the pan turner as well as pushing the uprighted pans out of the pan turner.

The aforementioned objects of the present invention are achieved generally by a pan turning apparatus which has a pan receiving surface for receiving pans from a pan greasing machine. As a newly greased pan is forced out of the pan greasing machine, the pans upon the pan receiving surface will slide across the surface and into a rotor which is provided with a single slot which runs substantially through the center thereof. Once an inverted pan has been placed into the rotor, fluid actuated means is activated to rotate the rotor by 180°, thus turning the inverted pan to an upright position. When the next pan is forced from the pan greasing machine, another inverted pan is forced into the slot in the rotor causing the upright pan to slide out of the rotor and towards the dough depositing machine.

In order to more fully understand the aforementioned objects, features, and advantages of the present invention, the following more particular description of a preferred embodiment of the present invention is provided in combination with the drawings which form a part of the original disclosure in which:

FIG. 2 is a fragmentary side elevational view showing the detail of the rotor stop mechanism;

FIG. 3 is a sectional view taken along lines 3—3 of FIG. 2;

FIG. 4 is a sectional view taken along lines 4—4 of FIG. 2.

Figure 1:
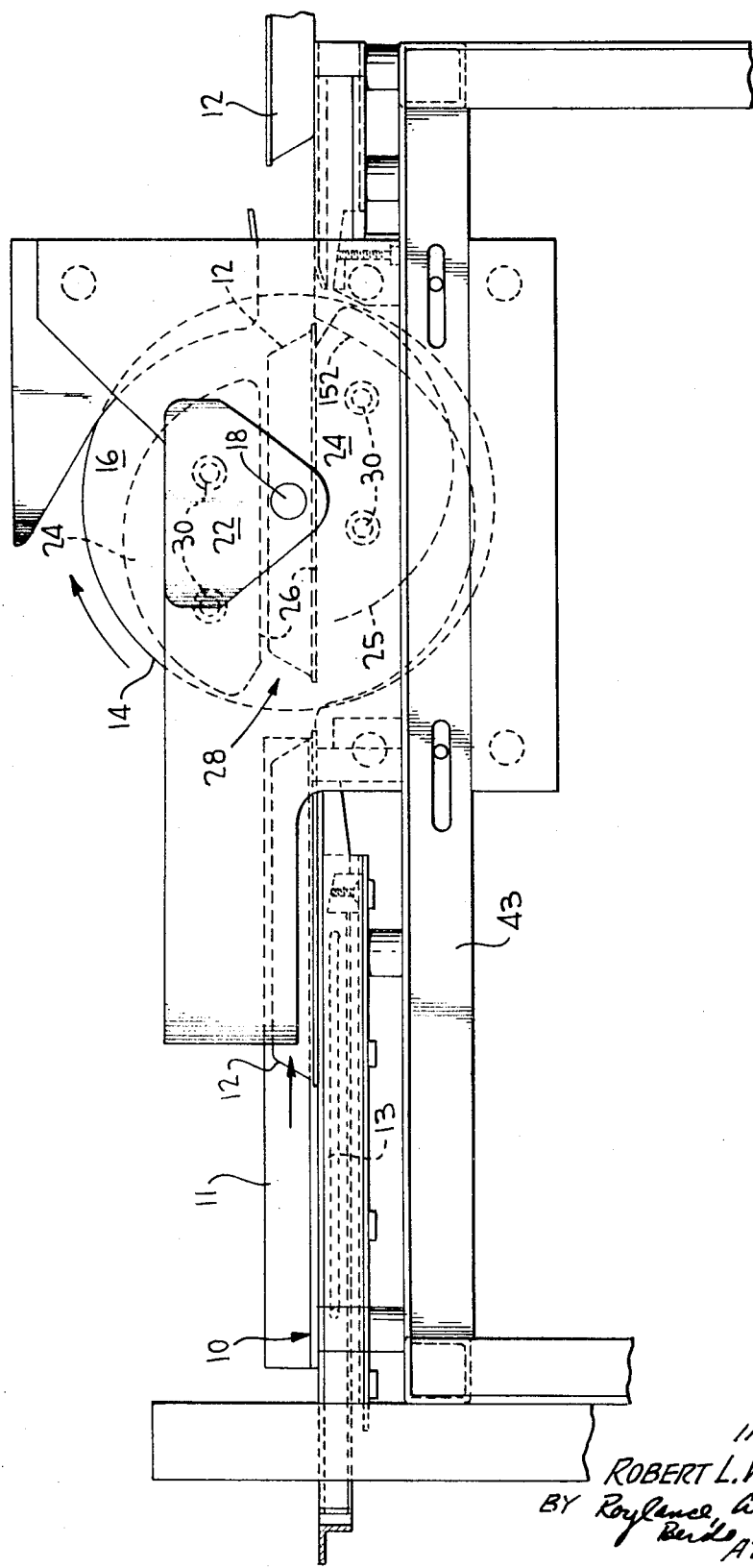
FIG. 1 is a side elevational view of the pan turning device.

In the pan turning apparatus as shown in FIG. 1, a pan receiving surface in the form of a generally horizontal surface shown generally as 10, is provided for receiving inverted pans from a conventional pan greasing apparatus not shown. A pair of spaced side walls 11 are provided and are attached perpendicularly to opposite sides of the pan receiving surface 10 to provide a guide for the inverted pans 12, shown with their greased surfaces facing downwardly towards the pan receiving surface 10. A pan feeding means in the form of a conveyor 13 feeds the inverted pans forwardly.

Positioned to the right of the pan receiving surfaces 10 in FIG. 1 is the pan turning rotor shown generally as 14. The rotor 14 is comprised of two spaced, circular end members 16, each of which is positioned to rotate about axis 18, the axis of the two axle members 20, each being attached to a single rotor end member 16. The axle members 20 extend perpendicularly outward from the end members 16 as shown in FIG. 4, and one axle is journalled in a support member 22 while the other axle 20 is journalled in a similar vertical support, not shown.

A pan receiving slot, shown generally as 28, is provided between the end rotor members 16. The pan receiving slot is comprised of four connecting rods 30 which are positioned between and pass through the rotor end members 16 and are bolted by bolts 32 to the rotor end members 16 and mounted upon pairs of connecting rods are several pan support members 24. Each pan support member has a linear or flat edge surface 26 which forms a plane substantially perpendicular to the plane of the rotor end members 16. The linear surfaces 26 of two or more pan support members 24 which are mounted in parallel relationship upon the same pair of connecting rods 30 form a plane upon which a pan can rest when positioned between the rotor end members 16. Additional pan support members 24 are positioned along the other pair of connecting rods 30 with the linear surfaces 26 facing towards the other linear surfaces, the linear surfaces thus forming the slot 28 for holding pans between the rotor end members.

The pan support members 24 also have an arcuate surface 25 which is advantageous in preventing the jamming of the machine. When a pan is placed into slot 28, another pan on the incoming side may also extend into the area between the rotor end members 16. When the rotor end members 16 are rotated about axis 18, the arcuate surface 25 will contact the pan on the incoming side of the slot 28 and will force that pan rearwardly or in a leftward direction in FIG. 1, assuring that the pan is not caught in the rotating mechanism of the rotor.

The force required to rotate the rotor 14 is provided by a conventional air cylinder and piston assembly, not shown. The end of the piston or the piston rod can be attached to a rack 38 which engages with a pinion 40 to rotate the rotor 14 when the rack 38 is moved in a rightward direction as viewed in FIG. 1, but, which does not cause any rotation of the rotor 14 when the rack 38 is moved in a leftward direction, as viewed in FIG. 1.

For a greater detail of the driving mechanism, reference is made to FIGS. 2 and 4. The axle support member 22 is rigidly attached to but spaced away from a generally vertical frame support member 42 by bolts 44 which extend through spacers 58 and are secured with nuts 45 and the support member 42 is itself carried by the main machine frame 43. A bearing 46 is recessed within the support member 22 to rotatably support the axle 20.

The pinion 40 which engages the teeth of the rack 38 is also momented for rotation about the axis of rotation 18 by means of a bushing 48 which permits the pinion 40 to be freely rotatable about the axle 20. The bushing 48 has a radially extending portion 50 within which a pawl 52 is mounted. The pawl 52 engages an excapement or ratchet gear 54 which is attached to the axle 20.

Located above and in rolling contact with the top of the rack 38 is a cam follower 56 which is mounted on axle support member 22 by means of a self contained threaded stud. A spacer 58 is provided between the cam follower 56 and the support member 42. The purpose of this cam follower 56 is to maintain the rack 38 in engagement with the pinion 40 as the rack 39 is moved forwardly and rearwardly.

The movement of the rack 38 in a rightward direction as viewed in FIG. 2 will cause the pinion 40 to move in a clockwise direction causing the pawl 52 to engage the teeth of gear 54, thus rotating the axle 20 in a clockwise direction, and imparting rotary motion to the rotor end members 16. When the rack 38 is moved in a leftward direction, however, the pinion 40 rotates in a counterclockwise direction about axis 18 causing the pawl 52 to disengage from the gear 54. Thus, when the rack 38 moves leftwardly or rearwardly, the rotor end members 16 wil remain in a stationary position.

In order to insure that the end members 16 only rotate 180° and no further, a stop mechanism is provided to engage the end members 16 after each 180° of rotation. This stop mechanism is provided by means of the flat edge surface 100 on the radially extending portion 50 of the bushing 48. This edge surface 100 is generally cylindrical in shape with an axis of rotation coinciding with axis 18 of axle member 20, and as shown in FIG. 2, has a radius of curvature 102 about the axis of rotation 18. A cam segment 104 is mounted on the surface 100.

A downwardly extending lever 106 is pivotally mounted on one of the bolts 44, and centrally mounted on such lever is a cam follower 108 which is maintained in contact with a cam surface 104 as the pinion 40 is rotated either in a clockwise or counterclockwise direction.

In order to maintain the cam follower 108 in continuous contact with either a cam segment 104 or the surface 100, a compression spring 110 is used. The spring 110 surrounds a shaft 112, the shaft 112 being pivotally connected at one end 114 to the lever 106 and having its other end passing through a laterally extending plate 116 which is secured rigidly to the frame support member 42. The compression spring 110 is maintained in compression between the plate 116 and a washer 117 adjacent the pivotal connection 114, thus constantly biasing the lever 106 toward a position where the cam follower 108 engages the cam segment 104 and the surface 100.

At the lowermost end of the lever 106, another pivotal connection 118 attaches a connecting rod 120 to the lever 106. The connecting rod 120 is preferably a solid rod, the other end of which is pivotally connected at 122 to a clamp member 124. The clamp member 124 is mounted upon a circular shaft 126 by means of tightening a set screw 128. In addition, the clamp member 124 is prevented from rotating about the shaft 126 by a key 130 which engages a groove in the clamp 124 and also engages a groove in the shaft 126.

The shaft 126 passes perpendicularly through the support member 42 and on its innermost end supports rotatable stop member 134 which is secured to the shaft 126 by the tightening of a set screw 136. The rotatable stop member 134 is comprised of a linear section which extends substantially parallel to the support member 42 and also substantially parallel to the rotor end member 16. At the end of the rotatable stop 134 which is furthest from the shaft 126 is an axially extending portion which extends toward the end member 16. The axial extension of said stop 134 has an edge 135 which is of a sufficient length to permit contact thereof with a similarly shaped edge 137 of a fixed stop 138 which is secured to the rotor end member 16. A second fixed stop member 140 is also provided on the rotor end member 16 offest 180° from the first stop member 138.

In order to understand how the stop mechanism prevents the end member 16 from rotating more than 180°, reference should be made to FIG. 2. Because the biasing spring 110 pushes the lever 106 constantly to the left in FIG. 2, the cam follower 108 is held against either the cylindrical surface 100 or a cam segment 104 thereon. When the cam follower 108 is contacted against the surface 100, the lever 106 is in the position shown in solid lines, whereas when the cam follower 108 in contacted against a cam segment 104, the lever 106 is displaced to the right as shown in phantom lines.

Since the connecting rod 120 is coupled to the lever 106, it moves concurrently therewith. Thus, when the lever 106 is in its solid line position of FIG. 2, the connecting rod 120 is displaced farther to the left, thus rotating the clamp 124 and the shaft 126 clockwise. The movable stop member 135 will be swung inwardly to its solid line position of FIG. 2, where it does not and cannot contact either of the fixed stops 138 or 140, thus permitting the rotor to rotate freely. However, as a cam segment 104 contacts the follower 108 and pushes the lever 106 to the right, the connecting rod 120 causes the clamp 124 and the shaft 126 counterclockwise. This, in turn, swings the movable stop 134 to its dotted line position of FIG. 2 where its edge 135 contacts the fixed stop 138 to halt rotation of the rotor. The same cycle is then repeated, but on the next 180° rotation, the edge will contact the stop 140.

Since the stop members 138 and 140 are positioned near the periphery of the end member 16 at a location which is 180° apart, it will be clear that the incremental movement of the rack 38 can only cause the end member 16 to rotate through 180° of rotation for each activation cycle of the air cylinder 34.

Because of the centrifugal force exerted upon a pan resting in slot 28 as the end members 16 rotate, such a pan has a tendency to be accelerated away from the axis of rotation and, thus, out of slot 28. In order to prevent such movement of pans within the turner, upper and lower movement restraining guides 150, 152 are provided to prevent a pan rotating in slot 28 from being hurled out of the slot by the centrifugal force. The upper guide 150 is a plate-like member with a curved edge facing the rotor and is physically located between the end members 16 and the lower guide 152 is also a plate-like member with a curved edge facing towards the axis of rotation 18.

In order to further facilitate the operation of the pan turner the present invention, the curved or arcuate edges 25 of the pan supports 24 are positioned in a somewhat critical manner. The edge 25 closest to the upper guide 150 is curved in such a way that a pan, not completely forced out slot 28 by the entrance of another pan into the slot 28, will be forced out of the slot by the cam action of the curved edge 25 as the end member 16 rotates in a clockwise direction.

The curved edge 25 of the pan support 24, which is closest to the pan receiving surface 10 as the rotor rotates any pan which is not entirely within slot 28 in a leftward direction and back onto the pan receiving surface 10.

The surface 10 of the machine received inverted pans from a pan greasing machine. The pans are guided along the surface 10 by guides 11 to a rotor with a slot therein for receiving inverted greased pans. A power cylinder, in combination with a gear mechanism, provides the force necessary to rotate the rotor through 180° of rotation, thus turning over the pan within the rotor slot. The subsequent entry of another inverted pan into the rotor will force the upright pan out of the rotor and towards a dough depositing machine or another area.

While the foregoing description has been necessarily directed to a preferred embodiment of the present invention, it will be obvious to those skilled in the art that certain modifications can be made to the apparatus described without departing from the spirit and scope of the present invention as defined by the following claims.

What is claimed is:

1. Apparatus for inverting pans and the like, comprising:
    rotor means having a pan receiving slot formed therein;
    guide means for receiving a line of inverted pans and for guiding the same toward said rotor means;
    drive means for said rotor means, said drive means being operative to rotate said rotor means 180° in response to each actuation of said drive means;
    said 180° rotation of said rotor means thus causing an inverted pan in said slot to be turned upright; and
    pan feeding means for supplying inverted pans to said guide means and said rotor slot so that entry of an inverted pan into said slot serves to discharge an upright pan already disposed therein;
    said rotor means including a pair of spaced parallel end members having a plurality of connecting rods extending therebetween in parallel relation to the axis of rotation of said rotor means;
    a plurality of support members interposed between and in spaced relation to said end members and being mounted upon said connecting rods, said support members including an upper set thereof having flat lower edges and a lower set thereof having flat upper edges, said flat upper and lower edges being spaced apart from each other to define said pan receiving slot;
    said upper set of support members has arcuate upper edges and wherein said lower set of support members has arcuate lower edges, said arcuate edges serving to hold back inverted pans from said pan feeding means while said rotor means rotates.

2. Apparatus for inverting pans and the like, comprising:
    rotor means having a pan receiving slot formed therein;
    guide means for receiving a line of inverted pans and for guiding the same toward said rotor means;
    drive means for said rotor means, said drive means being operative to rotate said rotor means 180° in response to each actuation of said drive means;
    said 180° rotation of said rotor means thus causing an inverted pan in said slot to be turned upright;
    pan feeding means for supplying inverted pans to said guide means and said rotor slot so that entry of an inverted pan into said slot serves to discharge an upright pan already disposed therein;
    said drive means including
        an axle connected to said rotor means along the axis of rotation thereof;
        a pinion freely rotatably mounted about said axle;
        a rack engageable with said pinion; and
        power cylinder means connected with said rack to reciprocate said rack;
    said drive means further including
    an escapement mechanism to assure that said rotor means is rotated as said rack is moved to an extended position and to assure that said rotor means will not be rotated as said rack is retracted from such extended position, said escapement mechanism comprising:
        a unidirectional gear mounted on said axle; and
        a pawl member engageable with said unidirectional gear;
        said pawl member permitting said unidirectional gear to rotate in one direction but preventing reverse rotation thereof; and
    stop means to limit each rotation of said rotor means to 180°, said stop means comprising:
        cam means surrounding said axle;
        a pair of fixed stop members mounted in 180° spaced relation on one of said rotor end members;
        a movable stop member; and
        cam controlled mechanism responsive to the rotational position of said cam means to move said movable stop member to a position where it can engage against a fixed stop member to limit rotation of said rotor means.

3. Apparatus as defined in claim 2 wherein said cam controlled mechanism includes:
  a cam follower;
  a mounting lever upon which said cam follower is mounted;
  biasing means urging said lever and hence said cam follower toward said cam means;
  a pivot means connected with said movable stop member; and
  a connecting rod extending between said mounting lever and said pivot means.

4. Apparatus for inverting pans and the like, comprising:
  rotor means having a pan receiving slot formed therein;
  drive means operative to rotate said rotor means through 180° of rotary motion thereby causing an inverted pan in said slot to be turned upright;
  pan feeding means for positively feeding inverted pans into said slot in said rotor means so that entry of an inverted pan into said slot serves to discharge an upright pan already disposed therein;
  said drive means including rack and pinion means coupled with said rotor means and power means to advance said rack thereby causing said pinion to rotate said rotor means through said 180° of rotary motion; and
  stop means for limiting each rotation of said rotor means to 180° of rotary motion, said stop means including
    fixed stop means connected to said rotor means;
    movable stop means engageable with said fixed stop means; and
    control mechanism operative to move said movable stop means into engagement with said fixed stop means to limit rotation of said rotor means.

5. Apparatus as defined in claim 4 wherein said rotor means is mounted on an axle and wherein cam means attached to said axle serve to actuate said control mechanism.

* * * * *